(12) United States Patent
Ramasubbu et al.

(10) Patent No.: US 11,828,666 B2
(45) Date of Patent: *Nov. 28, 2023

(54) FORCE MEASUREMENT DEVICE

(71) Applicant: ILLINOIS TOOL WORKS INC., Glenview, IL (US)

(72) Inventors: Sunder Ramasubbu, Karnataka (IN); Somayya Ammanagi, Karnataka (IN); Vishal Raina, Karnataka (IN); Shivakumar C N, Karnataka (IN); Murali Mohan, Karnataka (IN)

(73) Assignee: Illinois Tool Works Inc., Glenview, IL (US)

( * ) Notice: Subject to any disclaimer, the term of this patent is extended or adjusted under 35 U.S.C. 154(b) by 341 days.

This patent is subject to a terminal disclaimer.

(21) Appl. No.: 16/995,381

(22) Filed: Aug. 17, 2020

(65) Prior Publication Data
US 2021/0102857 A1    Apr. 8, 2021

Related U.S. Application Data

(63) Continuation of application No. 15/771,949, filed as application No. PCT/US2016/048835 on Aug. 26, 2016, now Pat. No. 10,746,619.

(30) Foreign Application Priority Data

Oct. 28, 2015  (IN) .......................... 5803/CHE/2015

(51) Int. Cl.
*G01L 5/106* (2020.01)
*G01B 5/30* (2006.01)
(Continued)

(52) U.S. Cl.
CPC ............... *G01L 5/106* (2013.01); *G01B 5/30* (2013.01); *G01B 5/0004* (2013.01); *G01B 7/16* (2013.01);
(Continued)

(58) Field of Classification Search
CPC . G01L 1/00; G01L 5/101; G01L 5/106; G01L 5/0004; G01L 5/30; G01B 7/16;
(Continued)

(56) References Cited

U.S. PATENT DOCUMENTS 4,015,468 A    4/1977  Simon
4,263,810 A    4/1981  Chiu
(Continued)

FOREIGN PATENT DOCUMENTS

CN    1092165 A    9/1994
CN    1152955      6/1997
(Continued)

OTHER PUBLICATIONS

Int'l Search Report and Written Opinion for PCT Patent Application No. PCT/US2016/048835. (12 pages).
(Continued)

*Primary Examiner* — Jonathan M Dunlap
(74) *Attorney, Agent, or Firm* — McAndrews, Held & Malloy, Ltd.

(57) ABSTRACT

The present invention relates to a force measurement device that includes mechanical amplification of linear elastic deformation along the axis of loading by estimating the quasi-linear incremental displacement between two points on arcs inscribed due to angular movements of a pair of cantilever arms located on opposite quadrants on a closed contour load sensing element to improve the sensitivity, and hence the resolution, of the force measurement device.

20 Claims, 10 Drawing Sheets

(51) Int. Cl.
    *G01B 21/32* (2006.01)
    *G01B 21/22* (2006.01)
    *G01B 11/16* (2006.01)
    *G01B 7/16* (2006.01)
    *G01B 5/00* (2006.01)
    *G01L 1/00* (2006.01)
    *G01L 5/101* (2020.01)

(52) U.S. Cl.
    CPC .............. *G01B 11/16* (2013.01); *G01B 21/22* (2013.01); *G01B 21/32* (2013.01); *G01L 1/00* (2013.01); *G01L 5/101* (2013.01)

(58) Field of Classification Search
    CPC ........ G01B 11/16; G01B 21/32; G01B 21/22; G01B 5/0004; G01B 5/30
    See application file for complete search history.

(56) References Cited

U.S. PATENT DOCUMENTS

| | | | |
|---|---|---|---|
| 4,581,947 | A | 4/1986 | Wulf |
| 6,370,971 | B1 | 4/2002 | Olson |
| 8,359,935 | B2 | 1/2013 | Mcneilly |
| 9,546,917 | B2 | 1/2017 | Groden |
| 10,100,662 | B2 | 10/2018 | Gallimore |
| 2011/0011188 | A1 | 1/2011 | Mcneilly |

FOREIGN PATENT DOCUMENTS

| | | | | |
|---|---|---|---|---|
| CN | 1624444 | A | 6/2005 | |
| CN | 1645482 | | 7/2005 | |
| CN | 1731114 | | 2/2006 | |
| CN | 102072793 | A | 5/2011 | |
| CN | 206847836 | | 1/2018 | |
| JP | S4123749 | | 12/1966 | |
| JP | 201414202577 | A | 10/2014 | |
| WO | 2014036010 | | 3/2014 | |
| WO | WO-2017108673 | A1 * | 6/2017 | ......... A61B 17/1746 |

OTHER PUBLICATIONS

Liu, Lu. et al. (2014) Deflection angle measurement system for microstructure based on microscope optical lever. Guangxue Jishu/ Optical Technique. 40. 219-224.10.3788/GXJS20144003.0219 (6 pages).

Liu, Hongtao et al., A Method for Deformation and Force Measurement of Micro-Cantilever Based on Local Feature Point Detecting and Matching, Journal of Shanghai Jio Tong University, Dec. 31, 2013.

Korean Office Action Appln No. 10-2018-7014760 dated Nov. 11, 2022.

* cited by examiner

FORCE MEASUREMENT DEVICE

RELATED APPLICATIONS

The present application is a continuation of U.S. patent application Ser. No. 15/771,949, which was filed on Apr. 27, 2018, which is a National Phase Entry of PCT International Application No. PCT/US2016/048835, which was filed on Aug. 26, 2016 and claims the benefit of Indian Patent Application No. 5803/CHE/2015 filed Oct. 28, 2015.

FIELD OF INVENTION

The invention relates to a force measurement device typically used in material and structural test systems for precise measurement of static and dynamic loads.

BACKGROUND OF THE INVENTION

A typical force measurement device, also known as load cell, consists of a load sensing element which deforms elastically in proportion to applied load. This in turn changes the electrical properties of sensitive elements such as strain gauges bonded to the load sensing element. Such a change in electrical properties can be correlated to the applied load. Force transducers, in industrial applications, typically use this principle.

The sensitivity of a force measurement device is defined as the ratio of the change that can be measured in the physical parameter to the smallest change in the force actually applied. The higher the sensitivity, the better the resolution of the force measurement device is. The sensitivity of the force measurement device is improved either by mechanical amplification of elastic deformation or electrical amplification of the electrical property like voltage or current.

Force measurement devices are typically of two types: (a) proving ring based, and (b) strain-gauge based. In the proving ring based load cells, the linear elastic deformation, along the loading axis of the ring shaped force sensing element, is measured directly (without any mechanical amplification) to indicate the applied force. The sensitivity of the force measurement device is limited by the sensitivity of the displacement sensor, typically linear variable differential transformer (LVDT), used to measure the elastic deformation. In the strain-gauge based force measurement devices, a set of calibrated foil resistance strain-gauges are mounted in a particular pattern on flexural arms to pick up compressive or tensile strain. These strain-gauges are arranged to form an electrical circuit called full Wheatstone's bridge, the output voltage of which is correlated to the force applied to the load sensing element. In these prior art load cells neither the elastic deformation nor the electrical property is amplified but the output electrical signal, which is typically in the order of mV (millivolts), is amplified to V (volts) via additional electronic signal conditioning boards. However, the amplification of the electrical signal results in high noise-to-signal ratio. The better reported resolution of these load cells is in the order of 0.02-0.05% of the full scale. Such amplification of electrical signal involves use of analog electronics, such as analog-to-digital converter, signal conditioning hardware, etc.

SUMMARY OF THE INVENTION

The present invention discloses a force measurement device that includes mechanical amplification of linear elastic deformation along the axis of loading by estimating the quasi-linear incremental displacement between two points on arcs inscribed due to angular movements of a pair of cantilever arms located on opposite quadrants on a closed contour load sensing element to improve the sensitivity, and hence the resolution, of the force measurement device.

The force measurement device according to the first aspect of the invention includes a closed contour load sensing element that is axisymmetric along the axis of loading (y-axis) and the axis normal to it (x-axis). The device includes a first cantilever arm mounted on the contour in one of the quadrants, and a second cantilever arm mounted on the contour in the opposite quadrant of the contour, where free ends of the first and second cantilever arms are positioned inward of the contour such that the arms are perpendicular to an arc at a fixed end on the contour. Deformation caused by applied load causes both the arms to infinitesimally rotate about their fixed point which results into quasi-linear movement of the free ends of the cantilever arms to enable mechanical amplification of the deformation along the axis of loading.

In another aspect of the invention, the first and second cantilever arms are respectively located at an angle $\alpha$ and $\alpha+180$ with respect to the x-axis such that angular movement of the arms about their fixed end is maximum for any applied load.

In another aspect of the invention, at the free end of the first cantilever arm a linear digital encoder is mounted, and at the free end of the second cantilever arm an encoder scale is mounted such that the linear digital encoder and the encoder scale are parallel and opposite to each other and lie along movement of the free ends of the arms.

In a preferred aspect, under compression load, the first and second cantilever arms turn counterclockwise about their fixed end by an angle $-\beta/2$, and under tension load, the cantilever arms turn clockwise about their fixed end by an angle $\beta/2$.

In another aspect, the first and second cantilever arms have lengths, such that, an imaginary line, passing through free ends of the first and second cantilever arms, also passes through the center of the contour.

In another aspect, under applied load and corresponding deformation free ends make quasi-linear movements on imaginary arcs, these quasi-linear angular movements lead to formation of an imaginary line which enables a mechanical amplification of four times the deformation.

The force measurement device according to another embodiment of the invention comprises a closed contour load sensing element axisymmetric along both loading axis and axis normal to the loading axis; the first, second, third and fourth cantilevers arms are mounted on the contour respectively at angles $\alpha$, $180+\alpha$, $180-\alpha$ and $360-\alpha$ with respect to x-axis, where the free ends of all the cantilever arms being inward of the contour such that the arms are perpendicular to an arc at a fixed end on the contour; wherein deformation caused by applied load effects quasi-linear movement of the free ends of the cantilever arms to cause mechanical amplification of the deformation along the axis of loading.

In a preferred aspect, the angle $\alpha$ with respect to x-axis of the contour is chosen such that the angular movement of each of the cantilever arms about its fixed end is maximum for any applied load.

In a preferred aspect, under compression load, the first and second cantilever arms turn counterclockwise and the third and fourth cantilever arms turn clockwise and under tension load, the first and second cantilever arms turn clockwise and the third and fourth cantilever arms turn counterclockwise.

BRIEF DESCRIPTION OF THE DRAWINGS

Referring now to the drawings wherein the showings are for the purpose of illustrating a possible embodiment of the invention only, and not for the purpose of limiting the same.

DETAILED DESCRIPTION OF THE EMBODIMENTS

Figure 1:
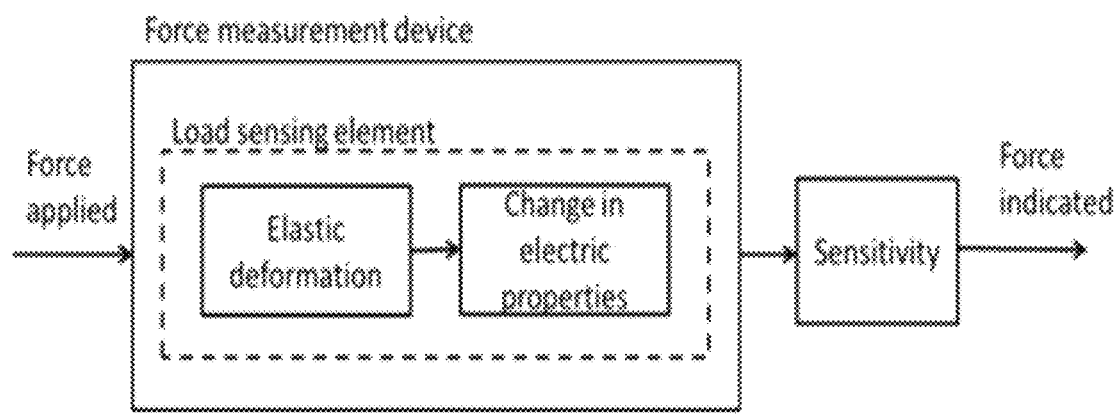
FIG. 1 shows the schematic of a typical force measurement device.

The schematic of a typical force measurement device that works on the principle of electrical amplification is shown in FIG. 1. The force applied on a load sensing element causes an elastic deformation of the element which would change the electric properties of, say, a strain gauge bonded with the element. The sensitivity of the force measurement device, defined as the ratio of the measureable change in the output (physical parameter) to the smallest change in the input (the applied force).

The present invention, as will be described further, provides a force measurement device that works on the principle of mechanical amplification of linear elastic deformation along the axis of loading.

The principle of operation of the force measurement device according to a first embodiment the invention will be explained with reference to FIG. 2. The force measurement device includes a stiff load sensing element having a closed contour (5) which is axisymmetric along the axis of loading and the axis normal to it. According to this embodiment, the axis of loading will be referred to as the y-axis and the axis normal to it will be referred to as the x-axis. The first cantilever arm (1) is mounted on the contour (5) in one of the four quadrants of the contour, and the second cantilever arm (2) is mounted on the contour in the opposite quadrant of the contour (5) with free ends of the arms (1, 2) being inward of the contour (5), such that each arm is perpendicular to the arc of the contour at its fixed end. The arms (1, 2) are located at specially selected angle with respect to the x-axis (normal to the loading axis) such that they undergo maximum angular movement about their fixed end for the same amount of contour displacement along loading direction.

The free ends of the arms (1, 2) inscribe arcs as the loading is varied. If contour dimension R=min(a, b) and elastic deformation $\delta/2$ (corresponding to load, P) of the load sensing element along the axis of loading such that R>>$\delta/2$, then the incremental quasi-linear distance $\Delta/2$ moved by the free ends of the arms (1, 2) are collinear and $\Delta=2\delta$. Now if the applied load is correlated to this mechanically amplified displacement $\Delta$ (resulting due to angular movement of the arms) rather than the elastic deformation $\delta$, the sensitivity of the force measurement device is twice the force measurement device based on the prior art proving ring.

Figure 2:
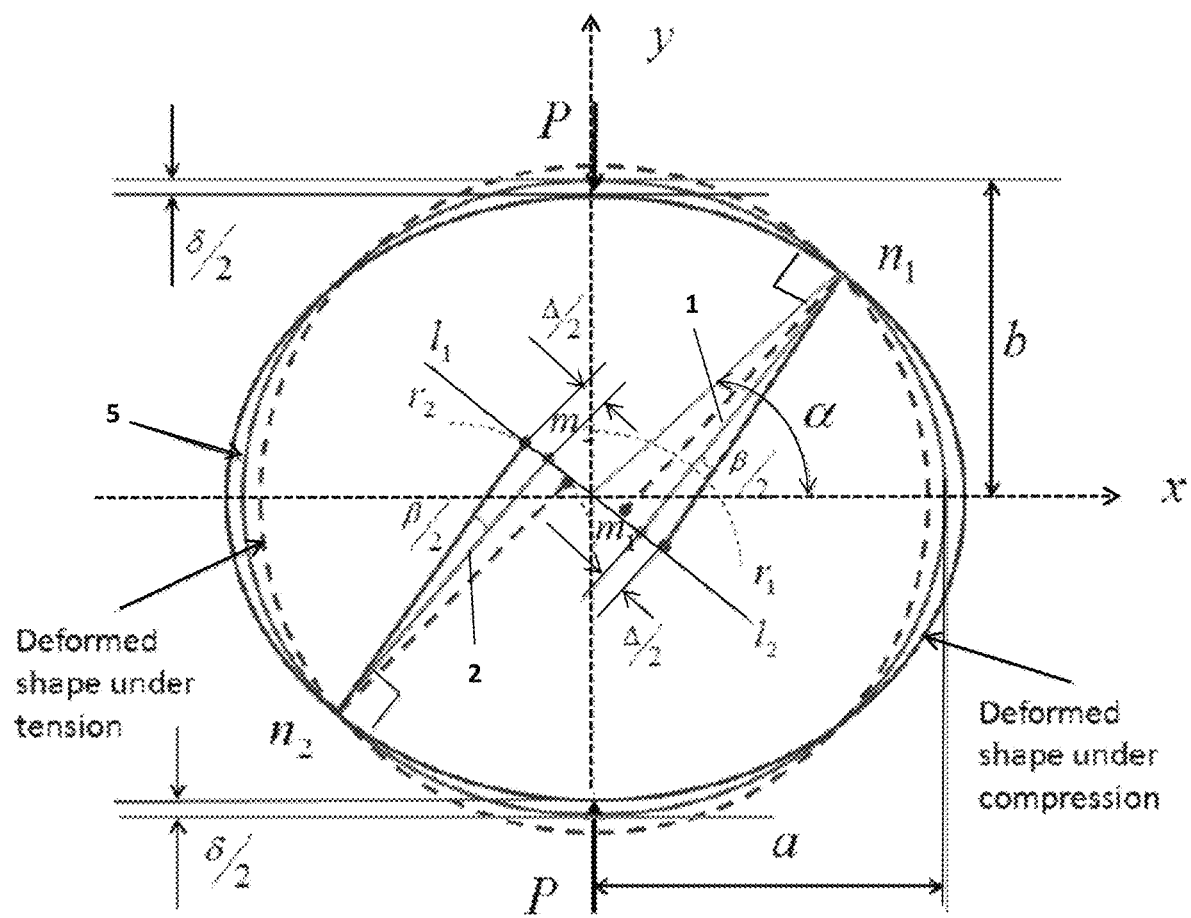
FIG. 2 shows the principle of operation of force measurement device according to a first embodiment the invention.

According to FIG. 2, the load sensing element is considered to be closed contour with semi-major axis a and semi-minor axis b, and is acted upon by tensile or compressive deflection along the y-direction. The contour shape remains undeformed when no force is applied and such a contour serves as a reference. The deformed contours refer to tensile and compressive deflections. Application of fully reversed tension-compression load of amplitude P causes a deformation of amplitude $\delta/2$ along y-direction. Rigid cantilever arms (1, 2) are represented as $n_1m_1$ and $n_2m_2$ (of equal lengths) in FIG. 2. The first arm (1) is located and fixed at $n_1$ and second arm (2) is located and fixed at $n_2$. The arms are free to move at other ends $m_1$ and $m_2$. The arm lengths are such that the line $l_1l_2$, passing through $m_1$ and $m_2$, also passes through the origin, i.e., center of the contour. The arms $n_1m_1$ and $n_2m_2$ are respectively located on the contour at angles $\alpha$ degrees and $180+\alpha$ degrees with respect to x-axis. These arms are perpendicular to the arc on the contour and remain so even under deformed conditions. During cyclic loading these arms rotate respectively about $n_1$ and $n_2$ such that the free ends $m_1$ and $m_2$ move on the arcs $r_1$ and $r_2$ respectively. During the excursion of loading:

(a) the arms are parallel at no-load condition, i.e., at P=0.0 and $\delta=0$; under this condition: the distance $L=m_1m_2=L_0$, (b) the arms turn counterclockwise by an angle $-\beta/2$ under compression load P and deformation $-\delta/2$; under this condition the distance $L=m_1m_2=L_c=L_0+\Delta$, (c) the arms turn clockwise by an angle $\beta/2$ under tension load P and deformation $-\delta/2$; under this condition the distance $L=m_1m_2=L_t=L_0-\Delta$.

The angle $\alpha$ is chosen such that angular movement of the arms $\beta/2$ is maximum for any applied load P. If the contour dimensions (a, b) and arm's length (S) are such that S, a, b>>$\delta$ then the points $m_1$ and $m_2$ make quasi-linear movements, corresponding to angular movements $\beta/2$, on the line $l_1l_2$ and it can be mathematically shown that:

$$\Delta = L_t - L_0 = L_c - L_0 \cong 2\delta.$$

Following this, at any point of loading, the linearized deformation along the line $l_1l_2$ is $\Delta_i \cong 2\delta_i$. This implies that for an elastic deformation of $\delta/2$ corresponding to applied load P along y-axis, there are two points $m_1$ and $m_2$ such that distance between them is almost incremented by $2\delta$, that is an amplification of 4 times.

Example

Below is an example for mechanical amplification of deformation along the axis of loading for load sensing element with closed contour of elliptical shape.

Given, a=55.0 mm, b=50.0 mm, S=52.25 mm, and $\delta/2=2.5\times10^{-5}$ mm

Results,
β/2=0.0001° and Δ/2=5.0×10$^{-5}$ mm

This mechanically amplified deformation is correlated with applied load along y-axis. The force measurement device built around this will have resolution doubly better than the one based on conventional proving ring.

Figure 3:
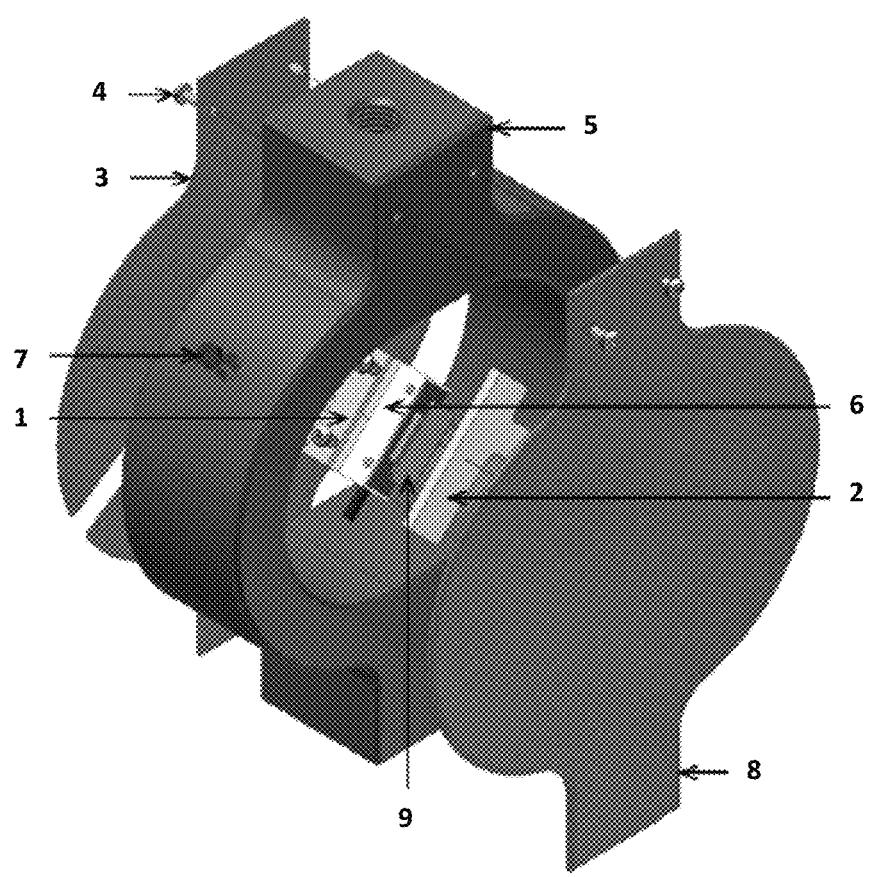
FIG. 3 shows the exploded view of the force measurement device based on the first embodiment.
Figure 4:
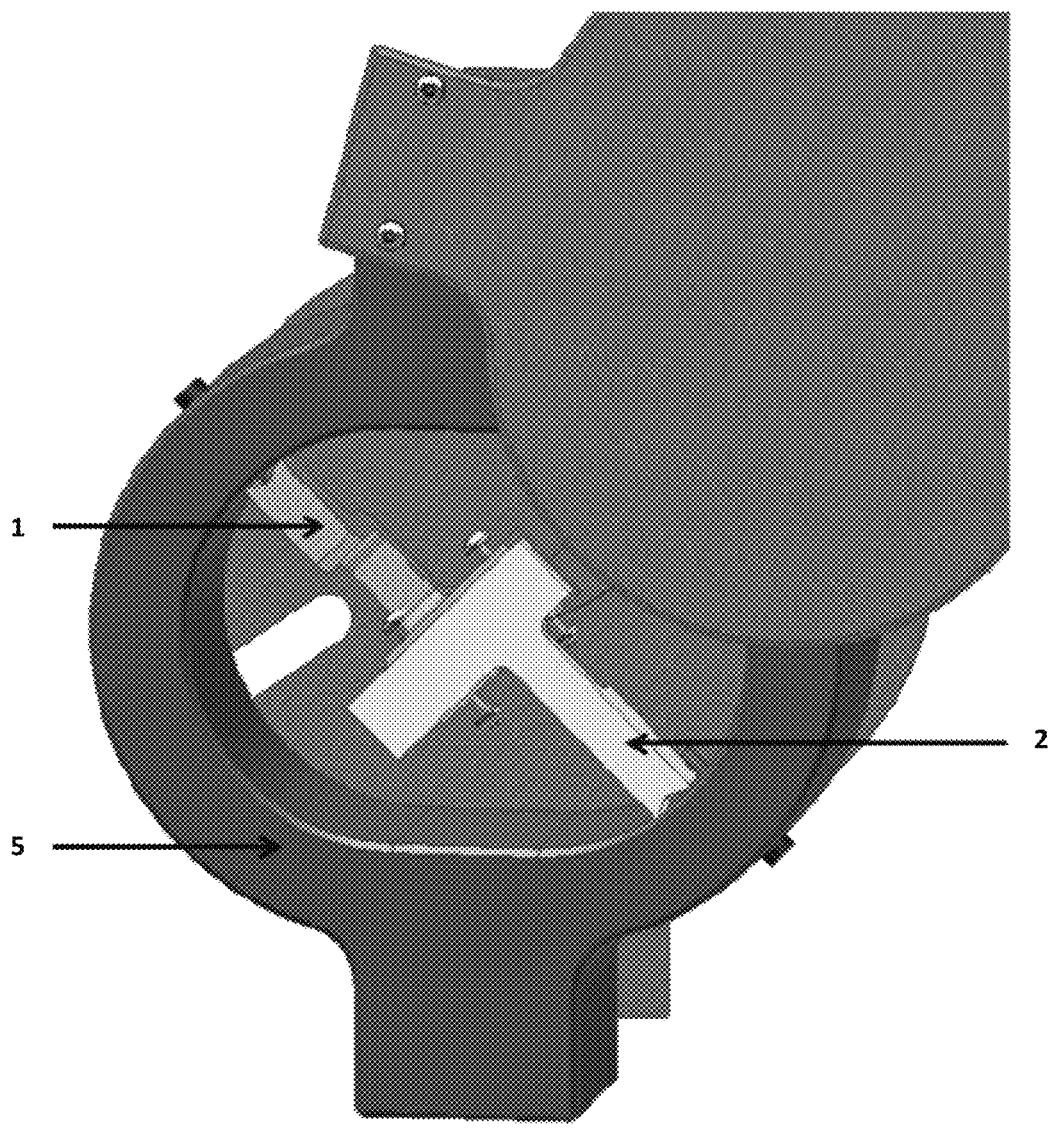
FIG. 4 shows another view of the force measurement device based on the first embodiment.
Figure 5:
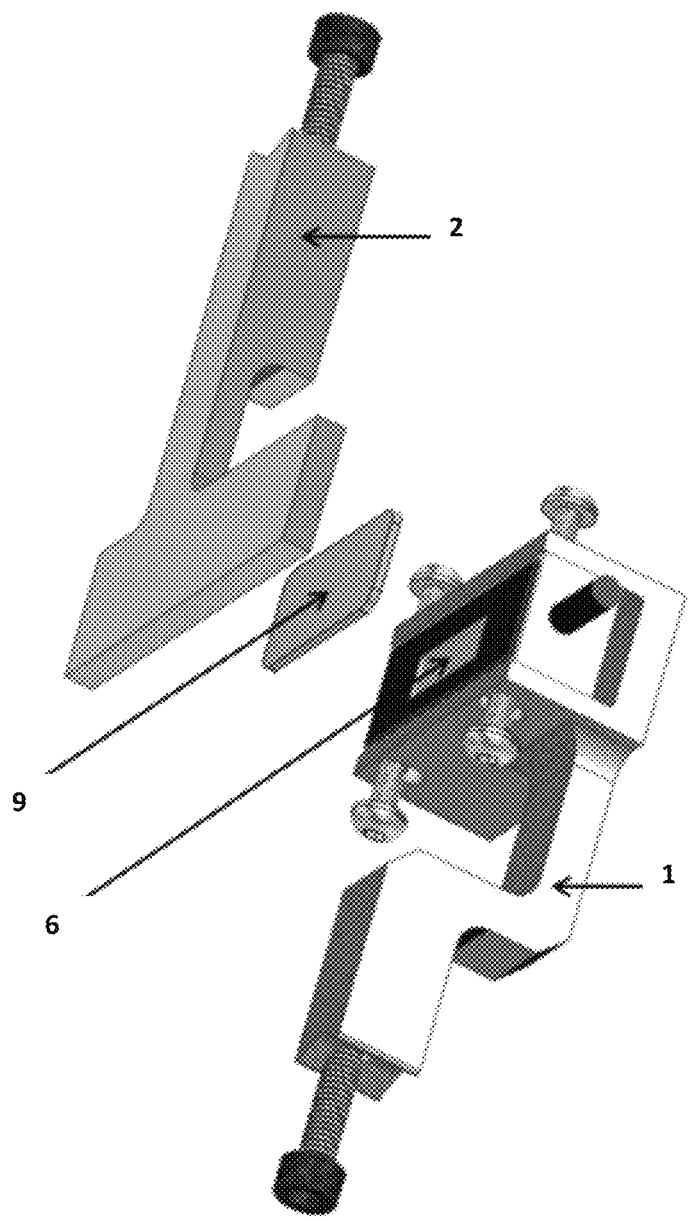
FIG. 5 shows the exploded view of the sensor mounting arrangement.

An exploded view of an exemplary force measurement device of capacity 25 KN based on the present invention is shown in FIG. 3. The force measurement device includes an axisymmetric closed contour (5), displacement sensor, i.e., digital encoder (6) and rigid cantilever arms (1, 2) fixed on the contour and free to rotate about their fixed end on the contour. The closed contour (5) of the load sensing element looks almost like an ellipse as it is formed by connecting two semicircles, located as mirror image at equal distance apart from the vertical line. At the free end of the first arm (1) a linear encoder (6) is mounted and at the free end of the second arm (2) an encoder scale (9) is mounted such that the encoder (6) and scale (9) are parallel and opposite to each other and lie along movement of the free ends of the arms as shown in FIGS. 3 and 4. The closed contour (5) is housed within a back cover plate (3) and a front cover plate (8) using fasteners (4, 7). FIG. 5 shows the exploded view of the encoder (6) and scale (4) mounting arrangement using the first and second cantilever arms (1, 2).

Figure 6:
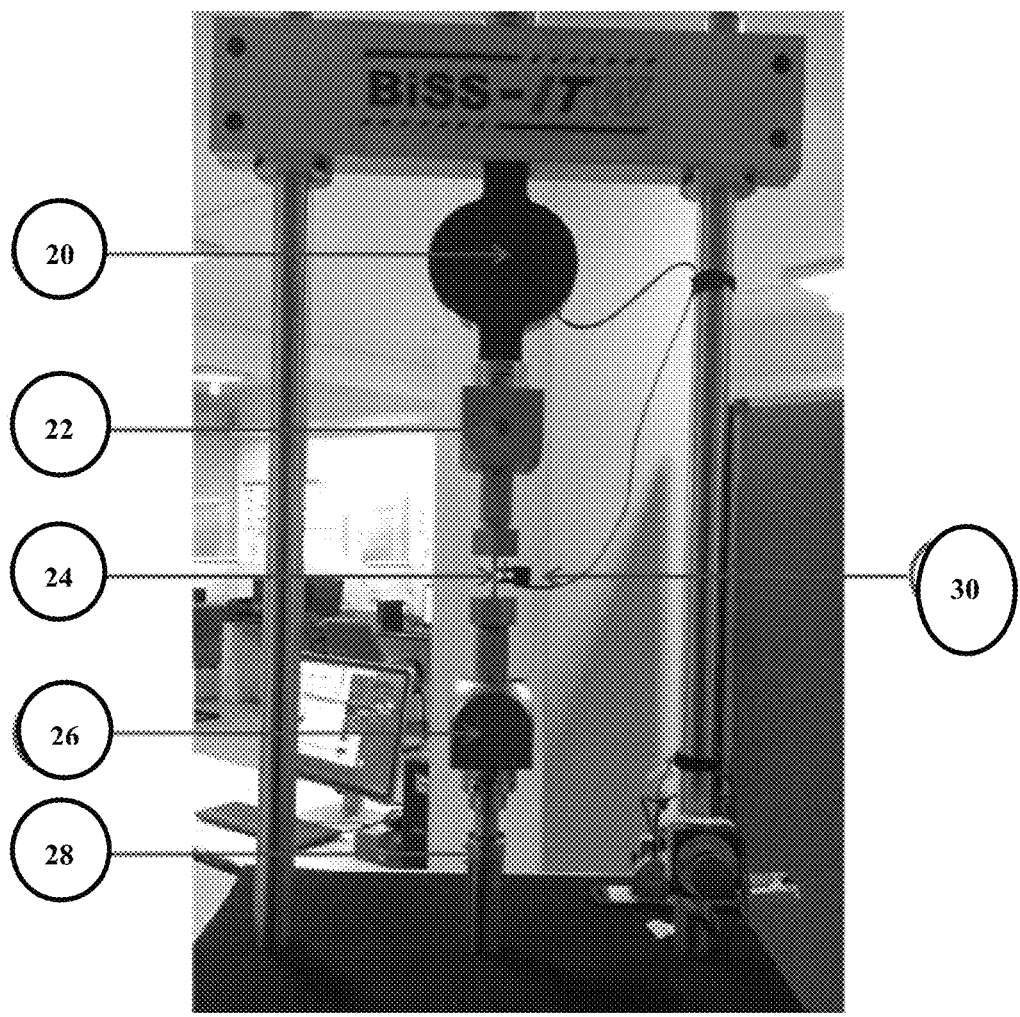
FIG. 6 shows the installation and operation of the load cell based on the present invention on a servo controlled material test system.

The mounting and installation of the force measurement device, based on the current invention, is demonstrated on a servo controlled electromechanical based portable material test system, typically known as plug and play NANO System by BiSS-ITW. The arrangement is shown in FIG. 6 which includes the force measurement device (20) according to the invention, top and bottom grips (22, 26), the test specimen (24), actuator piston (28) and crack opening displacement (COD) gauge (30).

Figure 7:
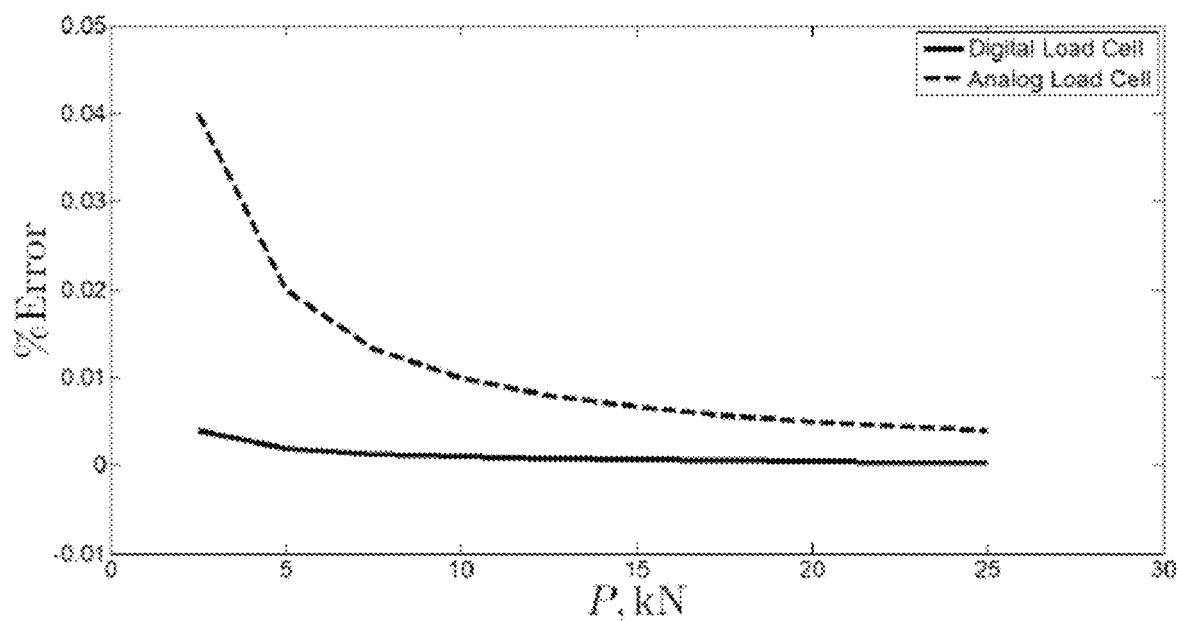
FIG. 7 shows the graphical representation of the comparison between accuracy of digital load cell of the present invention and that of load cell based on strain gauges.

FIG. 7 shows the graphical form of the comparison of the accuracy of the force measurement using the device based on the present invention (digital load cell) with that obtained from the load cell based on the strain gauges (analog load cell). The tabulated values of the graphical form are given below in Table 1.

TABLE 1

| P (kN) | % Error | |
|---|---|---|
| | Analog Load Cell | Digital Load Cell |
| 2.5000 | 0.0400 | 0.0040 |
| 5.0000 | 0.0200 | 0.0020 |
| 7.5000 | 0.0133 | 0.0013 |
| 10.0000 | 0.0100 | 0.0010 |
| 12.5000 | 0.0080 | 0.0008 |
| 15.0000 | 0.0067 | 0.0007 |
| 17.5000 | 0.0057 | 0.0006 |
| 20.0000 | 0.0050 | 0.0005 |
| 22.5000 | 0.0044 | 0.0004 |
| 25.0000 | 0.0040 | 0.0004 |

As a result of using the mechanical amplification of the linear elastic deformation of the contour along the axis of loading and measuring it with a high resolution encoder, the force measurement device based on the present invention provides resolution of the force measurement about 10 times more accurate than that measured from the load cell based on strain gauges.

Figure 9:
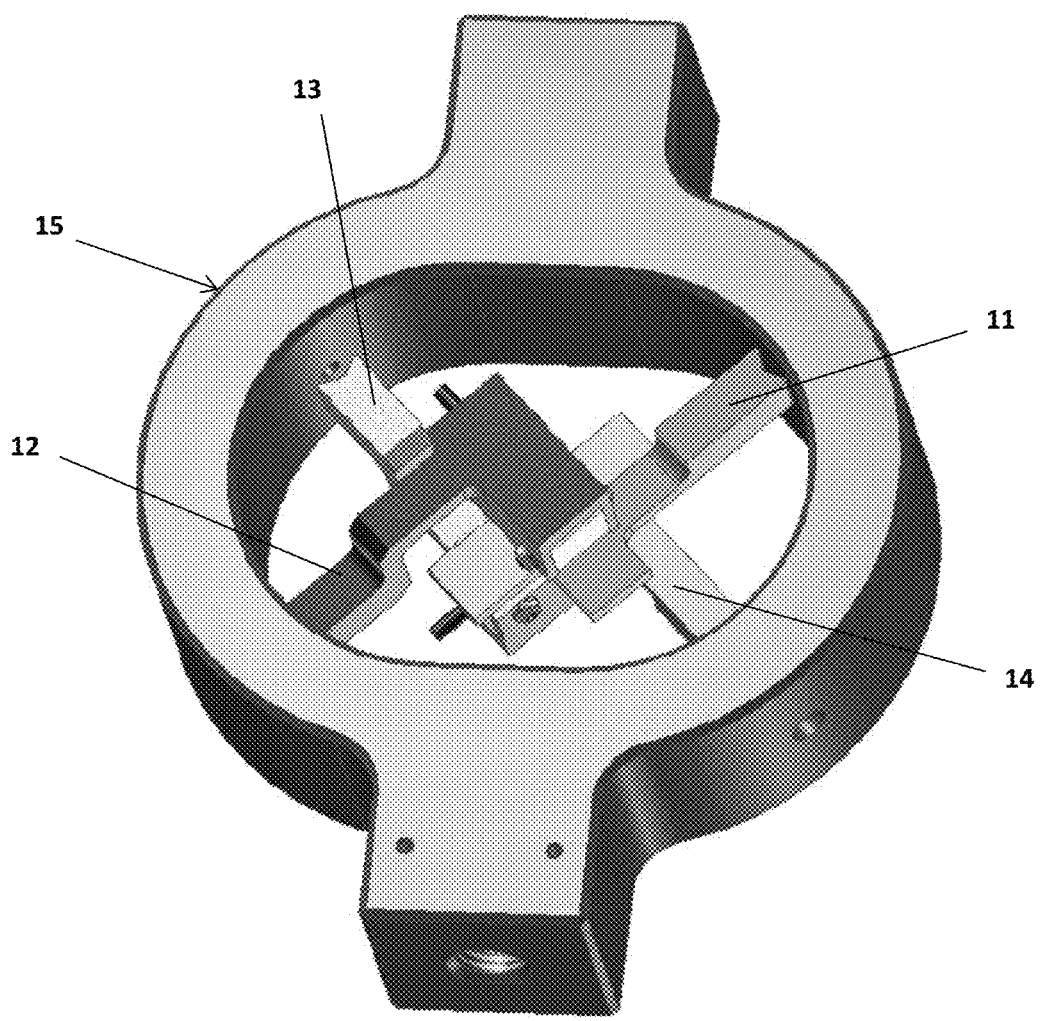
FIG. 9 shows the force measurement device according to the second embodiment with arrangement for measuring a pair of mechanically amplified displacements.
Figure 10:
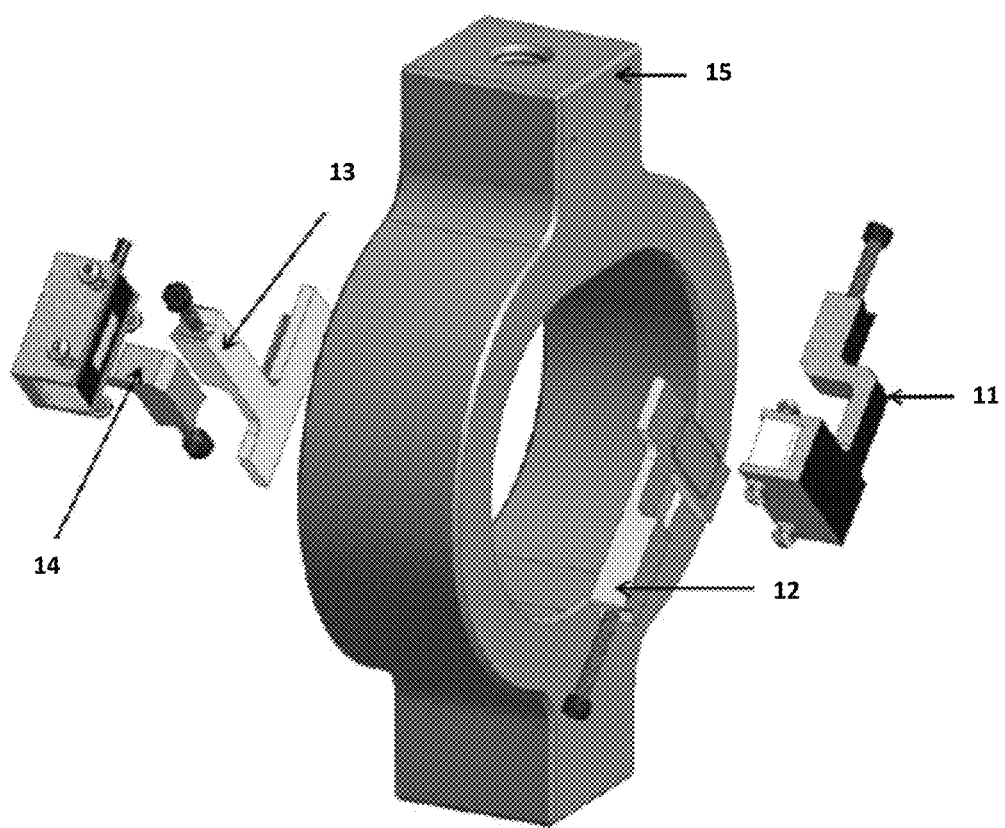
FIG. 10 shows the exploded view of the force measurement device according to the second embodiment with arrangement for measuring a pair of mechanically amplified displacements.

In another embodiment of the invention, the force measurement device, as an outcome of mechanical amplification of linear elastic deformation along the axis of loading, is that the measured force takes into account any misalignment in the axis of loading by measuring two sets of mechanically amplified displacements corresponding to the elastic deformation in the axis of loading. The principle behind this embodiment is illustrated in FIG. 8 and the design of the load cell based on this principle is shown in FIG. 9 and FIG. 10.

Figure 8:
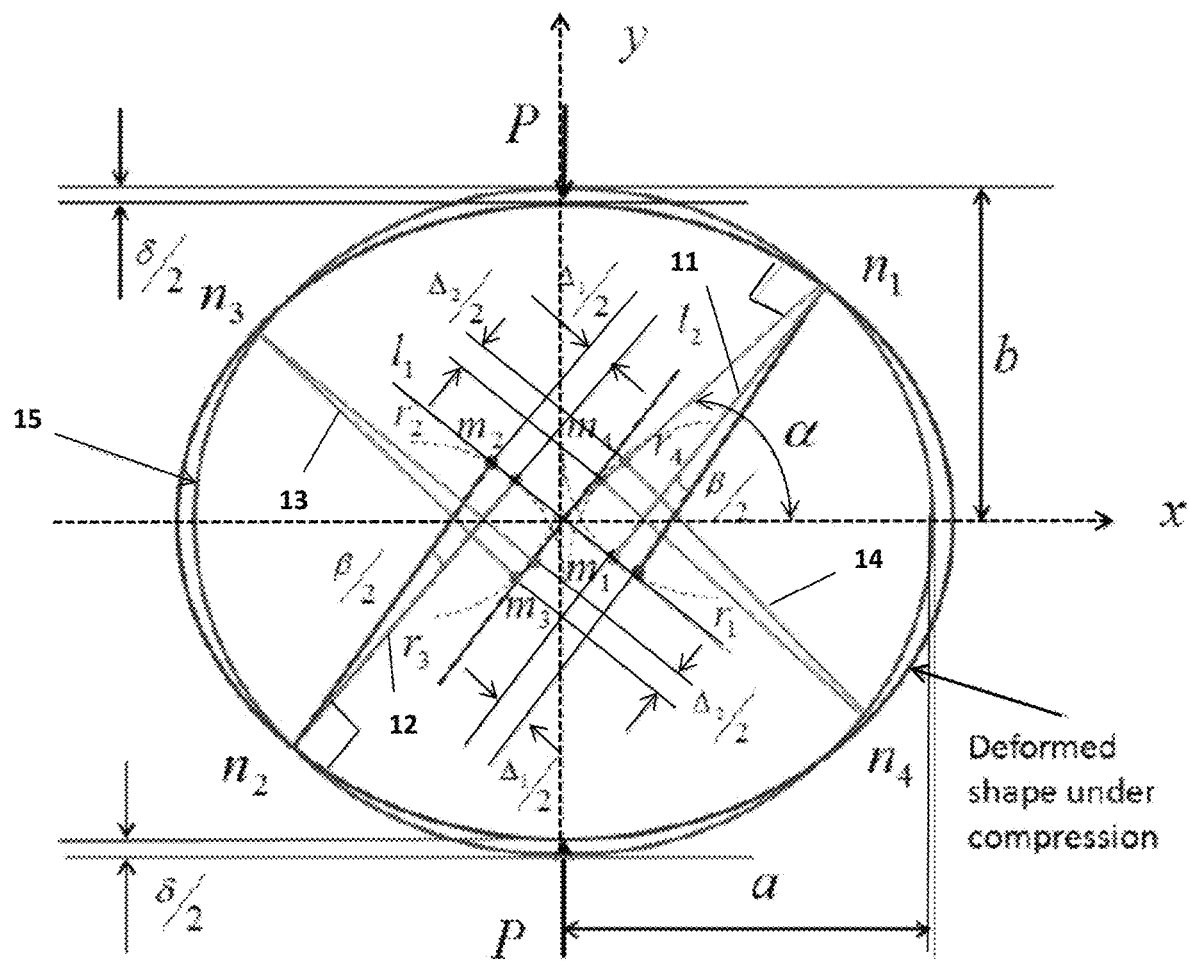
FIG. 8 shows the principle of operation of force measurement device according to a second embodiment of the invention.

FIG. 8 shows a closed contour load sensing element (15) axisymmetric along a loading axis (y-axis) and an axis normal to the loading axis (x-axis). The cantilever arms first (11), second (12), third (13) and fourth (14) are mounted on the contour (15) respectively at angles, 180+α, 180−α and 360−α with respect to x-axis.

The first and second cantilever arms (11, 12) form the first pair and the third and fourth cantilever arms (13, 14) form the second pair of cantilever arms. The free ends of the first, second, third and fourth cantilever arms (11, 12, 13, 14) are inward of the contour (15) such that each arm is perpendicular to the arc at the fixed end on the contour.

The closed contour load sensing element has a semi-major axis a and semi-minor axis b, and is acted upon by tensile or compressive deflection along the y-direction. The contour shape remains undeformed when no force is applied and such a contour serves as a reference. The deformed contours refer to tensile and compressive deflections. Application of fully reversed tension-compression load of amplitude P causes a deformation of amplitude δ/2 along y-direction. The first pair of cantilever arms (11, 12) are represented as $n_1m_1$ and $n_2m_2$ (of equal lengths) and the second pair of cantilever arms (13, 14) are represented as $n_3m_3$ and $n_4m_4$ located respectively at angles 180−α and 360−α degrees. The free ends $m_3$ and $m_4$ of the third and fourth cantilever arms (13, 14) make quasi linear movement $\Delta_2/2$ on the line $l_2$, as free ends $m_1$ and $m_2$ of the first and second cantilevers $n_1m_1$ and $n_2m_2$ make quasi-linear movement $\Delta_1/2$ on the line $l_1$, corresponding to the vertical deflection δ/2 of the closed contour (15). During cyclic loading, the first and second arms (11, 12) rotate respectively about $n_1$ and $n_2$ such that the free ends $m_1$ and $m_2$ move on the arcs $r_1$ and $r_2$ respectively. Third and fourth arms (13, 14) rotate respectively about $n_3$ and $n_4$ such that the free ends $m_3$ and $m_4$ move on the arcs $r_3$ and $r_4$ respectively Arms $n_3m_3$ and $n_4m_4$ rotate clockwise about $n_3$ and $n_4$, and arms $n_1m_1$ and $n_2m_2$ rotate counterclockwise about $n_1$ and $n_2$ when the closed contour is compressed vertically by δ/2. Here it can be shown that:

$$\Delta_1 \approx \Delta_2, \text{ and}$$

$$\Delta = (\Delta_1 + \Delta_2)/2$$

The averaged displacement derived above can be correlated to load P corresponding to vertical deflection δ/2 of the closed contour (15). Thus, any deviation in the readouts due to misaligned load can be avoided.

The mounting of the cantilever arms (11, 12, 13, 14) in the contour shaped (15) load sensing element is shown in FIGS. 9 and 10. Thus, the mechanical amplification along the axis of loading helps in designing load cells with improved sensitivity, resolution, and accuracy.

The implementation of the force measurement device according to the above embodiments, along with the use of high resolution encoder, has numerous advantages. The set-up is a fully digital load cell without the need of any analog electronic device thereby eliminating electronic hardware devices like analog-to-digital converter, signal conditioning hardware etc.

The transducer response is sensitive to contour shape change and insensitive to size change. Therefore, the device according to the invention is immune to drift with temperature. As long as the temperature is uniform across the device, the contour shape will not change. Therefore, force readout will also remain unchanged.

Further, the mechanical amplification of the elastic deformation results in a strictly or highly linear relationship between the force and amplified displacement since the amplified displacement is quasi-linear due to infinitesimal angular movement of the order of $1 \times 10^{-4}$ degrees.

The foregoing description shows and describes preferred embodiments of the present invention. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

We claim:

1. A force measurement device comprising:
a closed contour load sensing element axisymmetric along a loading axis and an axis normal to the loading axis;
a first cantilever arm mounted on the contour in a first quadrant of the contour, and a second cantilever arm mounted in a second quadrant of the contour opposite the first quadrant, where free ends of both the first and second cantilever arms are inward of the contour;
wherein deformation ($\delta/2$) caused by applied load (P) causes quasi-linear movement of the free ends of the cantilever arms to enable mechanical amplification of the deformation along the axis of loading; and
wherein, under compression load, the first and second cantilever arms turn counterclockwise by an angle $\beta/2$.

2. The force measurement device according to claim 1, wherein the first cantilever arm has a first fixed end mounted on the contour in the first quadrant of the contour, the second cantilever arm has a second fixed end mounted on the contour in the second quadrant of the contour, and the first cantilever arm is located at an angle $\alpha$ and the second cantilever arm is located at angle $\alpha+180$ such that angular movement of the cantilever arms about their fixed end is maximum for any applied load.

3. The force measurement device according to claim 2, wherein the cantilever arms are perpendicular to an arc at the respective fixed end.

4. The force measurement device according to claim 1, wherein at the free end of the first cantilever arm a linear digital encoder is mounted.

5. The force measurement device according to claim 4, wherein at the free end of the second cantilever arm an encoder scale is mounted such that the linear digital encoder and the encoder scale are parallel and opposite to each other and lie along movement of the free ends of the cantilever arms.

6. The force measurement device according to claim 1, wherein the first and second cantilever arms have equal lengths, such that, an imaginary line ($l_1 l_2$), passing through free ends ($m_1, m_2$) of the first and second cantilever arms, also passes through the center of the contour.

7. The force measurement device according to claim 1, wherein the closed contour of the load sensing element has an elliptical profile.

8. The force measurement device according to claim 1, wherein the load sensing element has a load capacity of 25 Kilo-Newtons.

9. The force measurement device according to claim 1, further comprising:
a front cover plate; and
a back cover plate, wherein the closed contour load sensing element is housed between the front cover plate and the back cover plate via a plurality of fasteners.

10. A force measurement device comprising:
a closed contour load sensing element axisymmetric along a loading axis and an axis normal to the loading axis;
a first cantilever arm mounted on the contour in a first quadrant of the contour, and a second cantilever arm mounted in a second quadrant of the contour opposite the first quadrant, where free ends of both the first and second cantilever arms are inward of the contour;
wherein deformation ($\delta/2$) caused by applied load (P) causes quasi-linear movement of the free ends of the cantilever arms to enable mechanical amplification of the deformation along the axis of loading; and
wherein, under tension load, the cantilever arms turn clockwise by an angle $\beta/2$.

11. The force measurement device according to claim 10, wherein the first cantilever arm has a first fixed end mounted on the contour in the first quadrant of the contour, the second cantilever arm has a second fixed end mounted on the contour in the second quadrant of the contour, and the first cantilever arm is located at an angle $\alpha$ and the second cantilever arm is located at angle $\alpha+180$ such that angular movement of the cantilever arms about their fixed end is maximum for any applied load.

12. The force measurement device according to claim 11, wherein the cantilever arms are perpendicular to an arc at the respective fixed end.

13. The force measurement device according to claim 10, wherein at the free end of the first cantilever arm a linear digital encoder is mounted.

14. The force measurement device according to claim 13, wherein at the free end of the second cantilever arm an encoder scale is mounted such that the linear digital encoder and the encoder scale are parallel and opposite to each other and lie along movement of the free ends of the cantilever arms.

15. The force measurement device according to claim 10, wherein the first and second cantilever arms have equal lengths, such that, an imaginary line ($l_1 l_2$), passing through free ends ($m_1, m_2$) of the first and second cantilever arms, also passes through the center of the contour.

16. The force measurement device according to claim 10, wherein the closed contour of the load sensing element has an elliptical profile.

17. The force measurement device according to claim 10, wherein the load sensing element has a load capacity of 25 Kilo-Newtons.

18. The force measurement device according to claim 10, further comprising:
a front cover plate; and
a back cover plate, wherein the closed contour load sensing element is housed between the front cover plate and the back cover plate via a plurality of fasteners.

19. A force measurement device comprising:
a closed contour load sensing element axisymmetric along a loading axis and an axis normal to the loading axis;
a first cantilever arm mounted on the contour in a first quadrant of the contour, and a second cantilever arm mounted in a second quadrant of the contour opposite the first quadrant, where free ends of both the first and second cantilever arms are inward of the contour;
wherein deformation ($\delta/2$) caused by applied load (P) causes quasi-linear movement of the free ends of the cantilever arms to enable mechanical amplification of the deformation along the axis of loading;

wherein the first and second cantilever arms have equal lengths, such that, an imaginary line ($l_1 l_2$), passing through the free ends ($m_1, m_2$) of the first and second cantilever arms, also passes through the center of the contour; and wherein under the applied load P and corresponding deformation $\beta/2$ the free ends ($m_1, m_2$) of the cantilever arms respectively make quasi-linear movement on imaginary arcs ($r_1, r_2$); these quasi-linear angular movements lead to formation of an imaginary line ($l_1 l_2$) which enables a mechanical amplification ($\Delta$) of four times the deformation ($\beta/2$).

20. The force measurement device according to claim 19, wherein the closed contour of the load sensing element has an elliptical profile.

\* \* \* \* \*